July 7, 1936.  C. WILHJELM  2,046,860
AUTOMATIC CONTROL SYSTEM
Filed Sept. 12, 1931  2 Sheets-Sheet 1

INVENTOR.
Christian Wilhjelm

July 7, 1936.  C. WILHJELM  2,046,860
AUTOMATIC CONTROL SYSTEM
Filed Sept. 12, 1931  2 Sheets-Sheet 2

INVENTOR.
Christian Wilhjelm

Patented July 7, 1936

2,046,860

UNITED STATES PATENT OFFICE 2,046,860

AUTOMATIC CONTROL SYSTEM

Christian Wilhjelm, Philadelphia, Pa., assignor, by mesne assignments, to Automatic Temperature Control Co., Inc., Philadelphia, Pa., a corporation of Pennsylvania Application September 12, 1931, Serial No. 562,593

2 Claims. (Cl. 236—15)

This invention relates to an improved method for the regulation of the temperature of stills and various types of furnaces such as pot furnaces, muffle furnaces, steam boilers, etc. where the heat is generated in a separate or partly separate chamber from the chamber where the heat is utilized and where it is desired to maintain conditions as steady as possible under whatever variable conditions occur during the operation of such equipment. The importance of this invention is best understood by comparing it with the system generally now used on such furnaces.

A temperature measuring instrument is inserted at the most suitable point in the section of the furnace where the temperature is desired to be maintained steady.

This measuring instrument is furnished with two or more electric contacts in order that it may actuate a valve or other restricting device in the fuel supply line to the furnace whereby the fuel supply to the heat generating chamber may be reduced when the work chamber temperature is above the desired point and likewise increased when the temperature in the work chamber is lower than desired.

However, due to the fact that it takes time for the heat to travel the response of the work chamber temperature to the fuel changes in the combustion chamber lags behind more or less, depending on the particular furnace design as well as on the rapidity of the changes in heat requirement in the work chamber.

It is not uncommon to have anything from 2 to 15 minutes lag, which here and in the following description will mean the time it takes for the measuring gauge to respond to a fuel change caused by it.

Take now for instance a furnace or pot where we will assume that the time lag is 5 minutes and that under no load conditions it requires a steady temperature of 1600° F. under the pot to maintain 1400° F. in the pot. Therefore, the differential is 200° F., a constant that nearly always can be relied on, so long as the furnace is left alone with a constant level of say molten lead. For hours such a furnace may be left alone and show practically no variation in the temperature of the lead, and providing the fuel supply is constant and continues 1400° F. will be maintained in the lead without control.

If now cold parts are inserted in the lead and removed at a constant rate or at a variable rate, this relation between lead temperature and combustion chamber temperature is immediately changed and the temperature of the lead will drop in proportion to the heat absorbed by the parts heated, unless more heat is supplied by the combustion chamber and that is as stated above, done by increasing the fuel supply when the lead temperature drops. If the increase is sufficient, it will in due time furnish enough heat to the lead to raise its temperature to the desired point. While accomplishing this, the temperature in the combustion chamber is raised to a greater and greater potential in order to increase the speed of the heat transfer to the lead. The longer the large flow of fuel is continued, the higher this combustion chamber temperature will increase above the 1600° mark and we will assume that under a certain load condition it raises to 2000° F. or 400 degrees in say 10 minutes at which time the temperature in the lead has reached its desired point of 1400° F. again. However, due to the 5 minutes average lag, the fuel supplied during the last five minutes of the 10 minute period, the full flow of fuel has been let loose in the combustion chamber has had no time to react on the lead temperature. It is, however, there in the form of increased temperature differential and will increase the heat transfer to the lead and raise its temperature far above the desired point even if the fuel supply to the combustion chamber was temporarily entirely cut off. It is heat let loose by the control and it prevents the control from controlling. If the controller in this case could have prevented the temperature in the combustion chamber from rising above 1800°, the lead would have reached its desired temperature just as well and almost as fast as if it was permitted to climb to 2000° F. and in that case there would have been no excess temperature in the combustion chamber to carry the lead temperature way above its desired holding point.

Now when the temperature as stated above has reached 2000° F. in the combustion chamber and the fuel supply has been reduced to nothing or at least to a very small minimum, then the combustion chamber will continue to give heat to the lead while the combustion chamber temperature is dropping off and the lead temperature may easily rise to 1500° F. while the combustion chamber drops to 1800. At this point, assuming the load condition remains constant, the lead will stop increasing in temperature as there is not enough temperature differential to continue the rise. Hence the lead drops slowly towards the 1400° F. mark. In the meantime, the temperature measuring gauge continues to register high for several minutes while the combustion chamber temperature drops below the 1800° F. mark. We will assume it will drop to 1200° F. before the lead drops below 1400° F. when the control gauge again will operate the control valve to open for the fuel supply. Now, however, due both to the time lag and to the fact that the combustion chamber is 200° F. lower than the lead, the lead continues to drop and may readily drop 100° F. to 1300° F. before the combustion chamber is again heated to and eventually above the 1600° F. mark when sufficient rate of heat transfer takes place to start the lead temperature up towards the 1400 mark again. Thus, a continuous pulsating condition of temperature variations takes place while the pot is used rather than a steadying condition.

Should a condition arise just at the time when the temperature in the lead has risen to 1400° F. with say 2000° F. in the combustion chamber, that the workman stops putting parts in the lead, the temperature of the lead may rise as high as to 1800° F. while the combustion chamber gradually cools down and eventually may go as low as 1000° F. before again the lead cools down to 1400° F. Again, if the workman sees his lead temperature is right at 1400 and begins to dip parts, he will quickly take so much heat from the lead that it can drop all the way down to 1200° F. before sufficient increased heat volume as well as potential is generated in the combustion chamber to start the lead temperature upward.

Due to the long time it now will take to bring the lead up to 1200° F. from 1000° F. the full fuel supply in the combustion chamber may raise its potential way up, possibly as high as 2200° F. before the lead gets above 1400° F. and cuts off the fuel and this will cause an even worse overshooting of the lead temperature than described previously.

It is readily seen that this method of control either requires that fluctuations in lead due to the dipping are slight and that the differential between lead and combustion chamber temperatures is not raised much above what is required for holding while the furnace is in use. As an example, if the load in the above described case had not been any greater than to require say a 50° F. increase in the differential, then the variations caused by load variations from full to no load would cause only very slight swings in the lead temperature and the system of control may be quite satisfactory. However, in nearly all cases in practice the differential between the temperature of the work chamber and the temperature of the combustion chamber is varying so much between load and no load conditions that the type of control described above is almost as good as no control at all. Furthermore, the tendency of raising the combustion chamber temperature far above what is necessary to maintain a given work chamber temperature has a tendency to cause destruction of the furnace walls much faster than would be the case if the combustion chamber temperatures were kept reasonably within actual requirements.

It is to overcome all these difficulties as well as to introduce real fuel economy combined with longer furnace life that this invention has been made.

The fundamental principle of the invention rests on the following two facts:

That in a given furnace left idling (that is, left under fire but without any other use of the heat than to maintain the heat losses due to radiation and conductivity) there will be an almost fixed differential necessary between work chamber temperature and combustion chamber temperature for a given value of the work temperature. As for instance as cited above, a 200° differential to maintain 1400° F. in the lead.

The other fact is that for each given load condition there will be a given increase to these 200° idling differential necessary in order to continue to maintain the lead at 1200° F.

In other words, instead of attempting to control the temperature of the work chamber indirectly by controlling the fuel input this invention relates to a method of controlling the temperature differential between the work chamber and the combustion chamber but strictly within certain predetermined limits established in each case.

In the drawings I describe two possible ways in which the invention can be carried out in practice.

Figure 1:
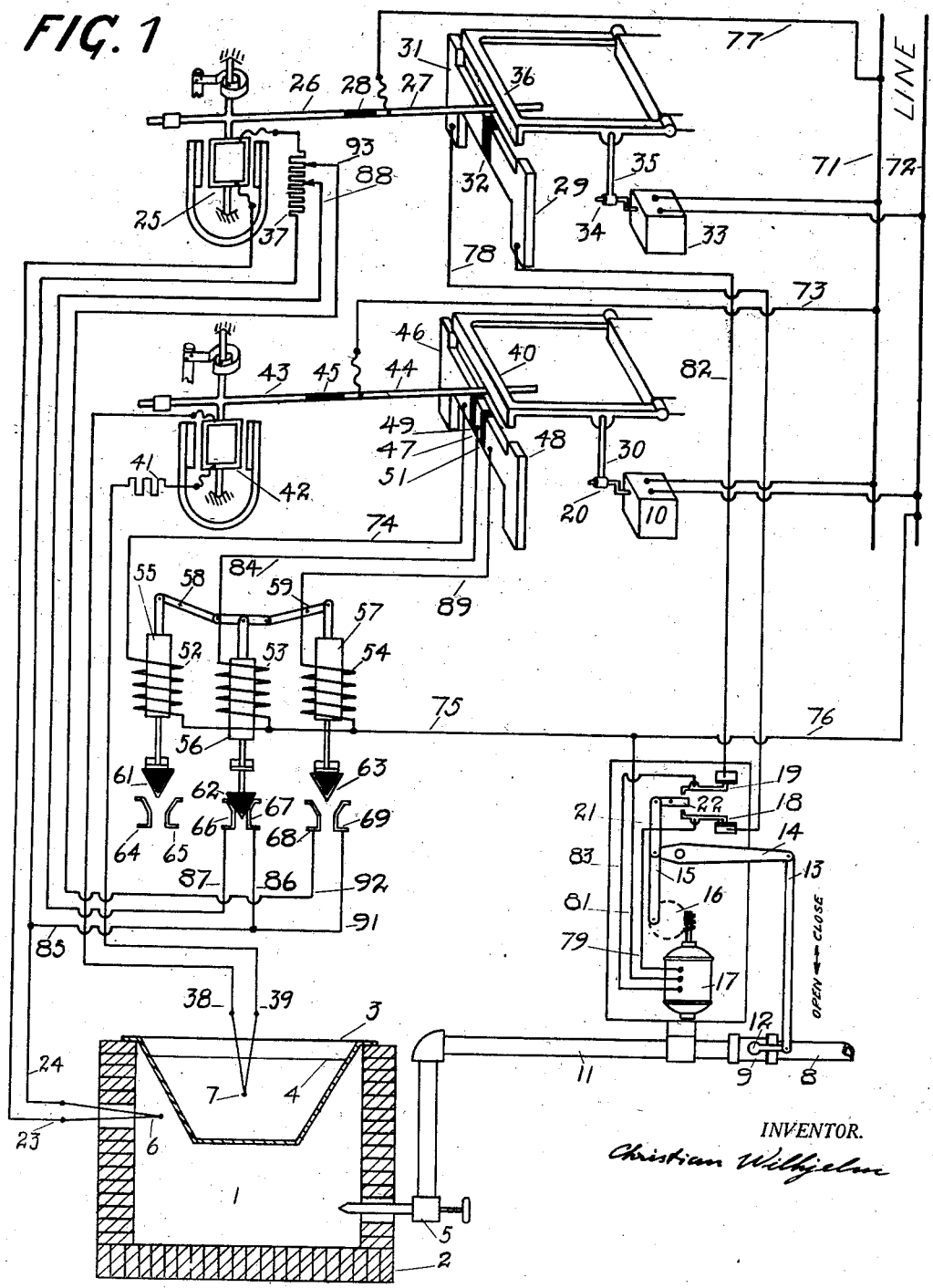
Figure 1 is a diagrammatic representation of the mechanical and electrical elements embodying my invention when using stationary contacts and variable resistors.

In Fig. 1, I denotes a combustion chamber of a furnace, 2 designates the brick wall of the furnace, 3 is a cast pot resting on top of the furnace wall, 4 is the surface of the lead in the pot, 5 designates a burner through which the fuel is injected into the combustion chamber 1, 6 designates a thermocouple inserted through the furnace wall into the combustion chamber. The furnace is shown diagrammatically as a cut through the middle of the wall and pot just where burner 5 and couple 6 enter 7 is another thermocouple inserted into the lead in the pot, 8 is a fuel supply line, 9 is a regulating valve in the fuel line, 11 is the fuel supply line between the control valve and the burner. 12, 13, 14 and 15 denotes operating levers for transferring opening and closing movements to the valve, 9, from the gear crank 16, which is operated by the reversible motor, 17, in either direction, depending on whether the valve, 9, is to be opened or closed. 18 and 19 denote the limit switches which break the motor circuit when the valve, 9, has reached either of its extreme positions. These limit switches are operated from the same lever system as the valve, by means of the levers 21 and 22. Through wire 23 and 24 the thermocouple, 6, is connected to the galvanometer 25. The galvanometer pointer, 26, will deflect in response to the temperature changes in the combustion chamber and its outer end, 27, which is insulated from the other part of the pointer by insulator 28 swings over a pair of contacts 29 and 31. These two contacts are insulated from each other by the insulator, 32. In practice, they are adjustable in relation to the galvanometer needle so that the galvanometer pointer, 27, will remain in between the two contacts 29 and 31 or over insulator, 32, whenever a certain desired temperature exists in the pot. The pointer, 27, is normally free to deflect in response to the temperature changes in the pot, but at predetermined intervals the small motor, 33, through its crank shaft, 34 and crank lever, 35, will push the hinged bar, 36, down on the pointer and clamp it against the underlying parts, 29, 32, or 31. As the crank, 34, turns, it will release the pointer so it will be free to readjust itself to the temperature changes that may have taken place while it was clamped. As the pointer is depressed, it will govern the operation of the motor, 17, to either open or close the valve, 9, depending on which of the contacts the pointer is clamped down on; all through the instrumentality of the electric wires which will be further explained under the explanation of the operation. The general construction of the galvanometer, althrough shown diagrammatically with its essential element is not further described, as it is so well known a device that such description is considered unnecessary.

In line 24 to the galvanometer is introduced a resistor, 37, so proportioned that when the current generated at the thermocouple 6 passes through the whole length of the resistor, the deflection of the galvanometer will be such as to hold the pointer 27 right over the insulated section 32 when the combustion chamber temperature is at the highest temperature desired in the combustion chamber The thermocouple, 7, inserted in the lead in the pot, 3, has two lead wires, 38 and 39 which connect it through a resistor, 41 with the operating movement of galvanometer, 42. The galvanometer pointer, 43, has an extension, 44, which is insulated from 43 by insulating material, 45. The outer section, 44, of the pointer, 43, swings over a section made up of three metal contacts, 46, 47 and 48 which are all insulated from each other by the two insulators 49 and 51 respectively. Through the motor 10, crank 20, lever 30 and hinged bar, 40, the pointer tip is alternately depressed on the contacts 46, 47 or 48, depending on its deflection. In practice, the contacts and the depressor mechanism is adjustable so that the following relation exists. When the temperature in the lead is exactly as required, it will generate a potential which will deflect the pointer, 44, to a position right above the contact, 47.

Through the electric wiring later explained in detail, the three solenoids, 52, 53, and 54 are energized alternately as the pointer, 44 is depressed on contacts 46, 47 or 48 respectively. This particular relay is explained in detail in my Patent 1,788,787 and details are omitted here for that reason as well as for the reason that it forms no essential part of my invention. Any electric relay which will perform substantially the same work may be substituted, or this relay may be eliminated if certain types of pyrometers now on the market are used where permanent contacts are made instead of intermittent contacts. When using such instruments, the contacts now operating the relay maintains the circuits established by the relay and are not connected to the line voltage but direct into the combustion chamber thermocouple circuit. Such control pyrometers are a common standard article on the market now, but they are very complicated to describe and the details of the principle of this invention would be less clearly brought to the fore had I used such pyrometers in my description. The three iron plungers 55, 56 and 57 hang suspended into their respective solenoids from an interlocked lever system, having two fixed pivot points 58 and 59 so that any one of the solenoids energized when pulling its respective iron core down will pull up which ever one of the other two that might be down. The bottom of the iron cores carries identical metal parts, 61, 62, and 63 insulated from the iron cores. These metal parts 61, 62, and 63 respectively when down bridge the metal contacts 64 and 65, 66 and 67, 68 and 69. Through the instrumentality of these parts and the intermediate wiring, the calibrating resistance, 37 is altered in the circuit of the combustion chamber couple, 6, so that the pointer, 27 will register 3 distinct different temperatures when in between contacts 29 and 31, actually resulting in the controlling of the combustion chamber temperature at different temperatures, depending on the temperature conditions in the lead in the pot. For simplicity, there are only shown three points here but introduction of four or more steps might readily be provided for without departing from the spirit of the invention.

The operation is as follows: assuming the furnace is started up from cold:

The thermocouple 7 will be imbedded in a mass of solid lead and registering no electric potential through the galvanometer and the pointer 4 will be way over against the stop on contact 46, which we, in the future will refer to as the low contact. The first depression of the pointer will close the following circuit—from line 71 through wire 73 to pointer 44, contact 46 wire 74 coil 52 wire 75 and 76 back to line 72, thus completing the circuit, energizing coil 52 and thereby pulling down core 55. This action will pull up core 56, shown down in the drawings, so that there will be no connection across from either 66 to 67 or 68 to 69. As shown in the drawings, there are no wires leading away from either 64 or 65 and the new position of the three plunger relay is a neutral one in relation to the whole system. Therefore so long as this condition of low temperature in the lead pot exists, the following circuit is maintained in connection with the combustion chamber thermocouple, from couple 6 to wire 23, galvanometer movement 25 and resistor 37, wire 24, back to the couple 6. As previously explained, this causes the galvanometer to read the correct temperature so that when the pointer, 27 is right above center insulator 32, the maximum temperature desired exists in the combustion chamber and we will assume this to be 1800° F. The furnace is cold to start and the pointer 27 will be over against the stop on contact 31, which in the future will be referred to as the low contact. The intermittent depressions of the pointer, 27 on contact 31 will close the following circuit: from line 71 through wire 77 to pointer 27, contact 31, wire 78, limit switch 18, wire 79 to motor 17 from motor 17 through wires 81 and 76 back to line 72 thus completing a circuit which will start the motor running in the direction that will move lever 14 downwardly to open the valve 9. Now with the valve 9 open, it is possible to light the burner in the furnace and consequently the combustion chamber will commence to heat up with the lead in the pot following very slowly after.

Eventually the combustion chamber temperature will reach the 1800° F. mark but the heat in the pot may still be several hundred degrees below the desired holding point of 1400° F. It is likely that it will take another hour before it reaches the 1400° F. mark. If now the ordinary control system explained above was used the burner would be permitted to continue at full speed for this whole hour, causing a possible rise to 2000° F. in the combustion chamber, regardless of the fact that if it was held at 1800° F. for almost the same period, the lead would reach 1600° F. just as well. Now therefore, as the 1800° F. is slightly exceeded in the combustion chamber, the galvanometer pointer, 27, will have moved over the insulated part, 32 and in over the insulated part, 29, thus when depressed closing a new circuit as follows: From line 71 through wire 77 pointer 27 contact 29 wire 82 limit switch 19 wire 83 motor 17 and back to other line 72 through wire 81 and 76. This circuit will cause the motor 17 to operate in a reverse direction from before when current entered it through wire 79 and it will actuate levers 14 and 13 to move upward to close down on the valve 9, thus reducing the fuel supply to the burner 5. This will in turn stop the increase in temperature and eventually make it drop slightly below 1800° F. When that happens, the galvanometer pointer, 27, will again be depressed on the low contact, 31, causing as previously explained a circuit to motor 17 that will function it to open the valve, 9, increase the fuel supply and raise the combustion chamber temperature to and slightly above 1800° F.

The above therefore clearly explains that so long as the lead is below its desired holding point, 1400° F., the combustion chamber is carried substantially at the 1800° F. mark, thus continuing to give heat to the lead in the pot without undue overheating of the furnace walls as well as the pot bottom.

When eventually the lead has reached the holding point, 1400° F., the galvanometer pointer, 4, will move in over contact, 47, which in the future will be referred to as the normal contact. As the pointer is depressed on this contact, the following circuit will be closed: From line 71 to wire 73, pointer 44 contact 47 wire 84 coil 53 wire 75 and 76 back to line 72. This circuit will energize coil 53 and pull down iron core 56 pressing contact 62 in between contact 66 and 67. In the same operation it also pulls up core 55 that it may be ready to be pulled down again, whenever its circuit is closed. The closing of the gap between 66 and 67 establishes two circuits for the combustion chamber thermocouple current as follows: from couple 6 to wire 24 resistor 37 and galvanometer 25 wire 23 and back to the couple but also from couple 6 wire 24 wire 85, 86 contact 67, 62 and 66 wire 87 sliding contact 88 part of resistor 37 the galvanometer and wire 23 back to thermocouple 6. This last circuit shorts the total resistance in the circuit and the galvanometer pointer will register higher than the exact temperature, how much higher depends on the position of the sliding point 88, but for an example to fit this case, we will assume this change in the circuit will cause the galvanometer pointer to read 200° F. high. Having been controlling the temperature in the combustion chamber at 1800° F., this sudden change in the calibration of the galvanometer will cause the pointer 27 to swing up above the neutral point 32 on the contact table, a distance equivalent to 200° F. temperature change. Therefore it will continue to be depressed on the high contact 29 closing down on the fuel valve 9 as previously described. The valve 9 will remain in the closed down position until the combustion chamber temperature has dropped 200° F. or slightly more so that the pointer 27 again will come over contact 31 causing the fuel valve 9 to open again and thereafter continue the alternate opening and closing movement of the fuel valve to maintain the pointer 27 on or near the neutral point, 32.

However, as the galvanometer is reading 200° F. high, its presence at this point indicates a temperature of only 1600° F. instead of 1800° F. as before. This decrease of 200° F. in the combustion chamber has an immediate effect in reducing the heat transfer to the lead pot a certain amount but there will still be some transfer of heat as the differential between pot and combustion chamber remains at 200° F., regardless of how long the pot temperature stays at the desired temperature represented by the center normal zone, contact 47. If the temperature in the lead rises above the normal while this condition exists so that the pointer 44 is depressed on contact 48, the following electric circuits will be established: From line 71 to wire 73 pointer 44 contact 48 wire 89 coil 54 wire 75 and 76 back to line 72. This circuit will cause plunger 57 to pull down permitting its contact member 63 to bridge between contact 68 and 69, while at the same time its downward motion through the upper lever system will pull plunger 56 up, thus breaking the connection across contact 66 to contact 67. This movement changes the electric circuit of couple 6 as follows: From 6 through wire 24, 85 and 91 contact 69, 63 and 68, wire 92 to point 93 on rheostat 37, thereby shorting out additional resistance in the complete thermocouple circuit. As an example, it will be assumed that this additional resistance reduction will make the galvanometer read 200° F. higher again or all in all, 400° F. high. The result of this will be that the pointer 27 will deflect up against the stop on contact 29 and when depressed cause the fuel valve 9 to close through the circuit already explained above. The valve, 9, will remain closing or closed at a minimum until the combustion chamber temperature has dropped another 200° F. or to 1400° F., equal to the holding temperature desired in the lead. When this temperature has been reached, there is no reason for letting it drop any further as certainly no heat can be transferred to the lead to cause it to raise above 1400° so long as the combustion chamber is at the same heat potential.

Therefore, due to heat losses from the lead to the surroundings the lead temperature will soon drop to its desired normal temperature of 1400° F. at which point again galvanometer pointer 44 will be depressed on contact 47 and as explained above, this will cause a change in galvanometer circuit 25 to change the point at which the temperature of the combustion chamber is controlled to 1600° F. or 200° F. above the desired lead temperature. This point 1600° F. as well as the other two extreme points at which the combustion chamber is controlled is selected by test in each individual case—in practice by moving the contact points 88 or 93 in relation to each other as well as by shifting the contacts 29 and 31 in relation to the pointer 27. This is necessary as these valves depend on the general characteristics of each individual furnace and the way it is loaded and unloaded.

Figure 2:
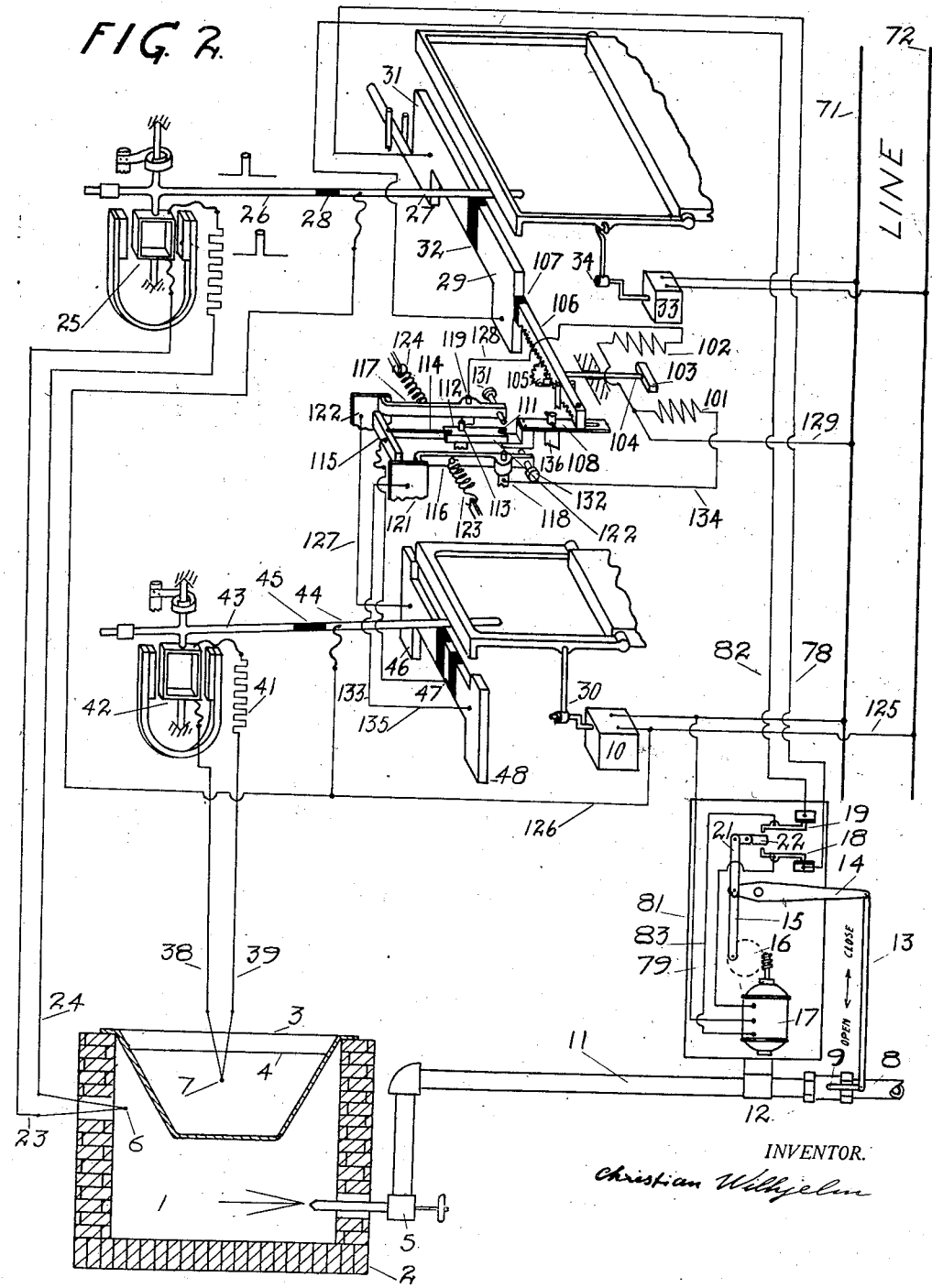
Figure 2 is a diagrammatic representation of the mechanical and electrical elements embodying my invention when using movable contacts.

Fig. 2 illustrates another way in which my invention can be carried out in practice. Substantially the same parts are used in this design as in the one described in Fig. 1 and all parts of equal design and function has been given the identical index numerals used for the same parts in Fig. 1. The function of these parts need not be repeated in detail, but it should be noted that the furnace is shown identical, the fuel supply and the valve and its controller as well. The pyrometer circuit with the couple in the lead is connected to its galvanometer in exactly the same manner as in Fig. 1, but instead of the circuits from contacts 46, 47 and 48 being wired to a three position relay which in turn changes the calibration of the galvanometer in the combustion chamber pyrometer circuit, these contacts are wired up to a small reversible motor governed by a special three position switch mechanism and which in turn shifts the contacts 29 and 31 alternately into three different positions in relation to the different positions of the pointer 27 so that the same result is obtained as shown in Fig. 1, that if the temperature is low in the lead the combustion chamber control galvanometer will raise the control point at which it is governed to say 1800° F. as in the first case, but by moving the contact table out from the paper until it is at a position where it represents the deflection point of the pointer, 27, representing 1800° F. Likewise when the lead pot temperature is normal or at 1400° F. used as an example for Fig. 1, the reversible motor will operate the contacts 29 and 31 into a position where they will cause the combustion chamber to be controlled at 1600° F.—if further the lead temperature goes above 1400° F. and causes contact 48 to be closed, the motor will function to change the contacts 29 and 31 inward from the face of the drawings, thereby causing the control point for the combustion chamber to be lowered. As an example—it may be lowered equal to the one used in Fig. 1 down to 1400° F.

The new parts incorporated in Fig. 2 are as follows:

101 and 102 are the reversing fields in the motor that shift the contacts 29 and 31. 103 is the armature and 104 is the motor shaft. 105 is a pinion on the motor shaft which meshes with the teeth of a rack 106 which in turn through an insulated section 107 is fastened to the contact assembly 29, 32, 31. At the opposite end of the rack, 106 is a flexible joint with one end of switch lever 108. Switch lever 108 is pivoted on stud 136. The other end of lever 108 carries a pin 111 which engages in a slot in switch arm 112. Switch arm 112 is pivoted on stud 113 and the end of the switch arm opposite the slotted end carries a flexible spring extension 114 which again carries a contact block 115. On either side of this switch arm 112 is another switch arm 116 and 117. These switch arms are pivoted respectively at 118 and 119 and they are pulled against contact plates 121 and 122 respectively by means of the springs 123 and 124. The one end of the contact arms 116 and 117 is normally free, but when the lever arm 108 swings to its extreme it will engage either the one or the other of the arms 116 and 117 and by so doing will break the respective arms engagement with the contact plate at their opposite ends.

The operation is as follows: When the lead temperature is low and pointer 44 depresses on contact 46, the following circuit is established: from line 72 through wire 125 and 126 to pointer 44 contact 46 wire 127 contact plate 122, contact arm 117 wire 128, motor field 102 wire 129 to line 71. This circuit will cause the armature 103, shaft 104 and pinion 105 to rotate in a clockwise direction when facing the pinion. This movement will move the rack outward from the paper and thereby shift the contact assembly 29, 32 and 31 in the same direction. This movement will further cause the pointer 27 to be depressed on contact 31, or the so called low contact. As previously explained in Fig. 1 this causes valve 9 to be opened to increase the heat under the lead. When moving the contacts the rack will also turn lever arm 108 so that its other end will eventually move over and push lever arm 117 to break contact with 122. This action will break the circuit that turned the motor and consequently it will stop, leaving the contacts 29 and 31 in a new position further up the calibration of galvanometer 25. How much the contacts are moved depends entirely on the adjustment of the switch arm 117. The two screws 131 and 132 serve to change the amount of movement of the rack before the switch breaks. In this manner it is possible to change the outer temperature limits in the combustion simply by adjusting these screws. Obviously the greater the temperature lag, the greater the differential in temperature must be, and consequently the adjustment of the limit switch in each case must be made to conform with the temperature lag. When the temperature lag is small, only a slight differential in the outer temperature is required and the limits are set close. When the temperature lag is great, it is necessary to open up the differential between the outer temperature limits, which is done by enlarging the distance between the two outer limit switches. In both cases, as previously explained, this is done by manipulating the screws 131 and 132. This is the equivalent to adjusting contact points 88 and 93 on resistor 37, Fig. 1. In this case we will assume that so long as the lead temperature is low the contacts 29 and 31 are so far advanced that they will cause the valve to open and close to maintain 1800° F. in the combustion chamber.

When now the temperature of the lead increases to the desired 1400° F. and the pointer 44 is depressed on contact 47, the following circuit will be established: from line 72 wire 125 and 126 to pointer 44 contact 47 wire 133 contact block 115. Due to lever arm 108 being thrown over against contact arm 117 the lower slotted end of lever 113 is turned the same way and consequently the other end carrying the flexible extension 114 and contact block 115 will be swung in the opposite direction and contact block 115 will be pressing against contact 121, thus establishing a continuation of the circuit from 115 to contact 121 switch arm 116 wire 134 motor winding 101, wire 129 and line 71. This circuit will cause the armature 103, shaft 104 and pinion 105 to rotate in an anticlockwise direction, and this movement will push the contacts 29 and 30 to a lower point on the calibration of galvanometer 25, thus causing it to control the combustion chamber temperature at a lower point. When the rack has moved far enough to move the lever 108 back into a position as shown in the drawings, the center arm 113 will have released the pressure of contact block 115 against contact 121 and actually broken contact with 121, thus stopping the further shifting of the contacts 29 and 31. It will, as an example, be assumed that the point where the contacts are thus stopped will cause the galvanometer to control the combustion chamber temperature at 1600° F. If now after a while the lead temperature raises above 1400° and the pointer 44 is depressed on contact 48 establishing the following circuit condition: Current will pass from line 72 to wire 125 and 126 to pointer 44, contact 48 wire 135 contact 121, switcharm 116, wire 134, motor field 101, wire 129 to line 71. This circuit will again cause the armature 103, shaft 104 and pinion 105 to rotate anti-clockwise pushing the contact assembly 29, 32 and 31 still further down the calibration of the galvanometer 25. When this movement takes place, the other end of the rack 116 pulls lever 108 towards the paper, thereby swinging the other end of this lever outward until it engages switcharm 116 and forces it to disengage contact 121. In this case it will be assumed, that the adjustment of screw 132 is such as to stop the contact assembly at a point where it will control the combustion chamber temperature at 1400° F. When lever 108 is in this position, the center switch arm 113 has its lower end turned outward with lever 108 due to the pin 111 engaging in the slot in the lever. This movement will force contact block 115 against contact plate 122. It will readily be seen that this changed position of contact 115 will reverse the action of a depression of pointer 44 on contact 47 so that it will cause the armature 103 to rotate in a clockwise direction, thus returning everything to the center normal position permitting control of the combustion chamber at 1600° F. again as soon as the lead temperature recedes to normalcy.

The above should clearly describe the operation of both ways of accomplishing the practical use of my invention. In both cases the ultimate result is the same. The temperature in the combustion chamber is raised or lowered between different fixed predetermined values in order to maintain the lead in the pot substantially constant, as the example in temperature values are picked, it may be assumed that the temperature in the lead will vary as follows, after first reaching the holding point; 1395° F. low, 1400° F. normal and 1405° F. high, then these temperature changes in the lead through the instrumentalities described above will cause the following corresponding temperature values in the combustion chamber; 1800° F. when lead is 1395° F. ±1600° F. when the lead is at correct temperature of 1400° F. and 1400° F. when the lead is high or 1405° F.

In practice, these temperature relations are varied to suit each individual furnace condition.

In this description, this invention is only described in a temperature control combination but the idea is far reaching into a large number of industrial control applications.

A boiler could be substituted for the furnace in which case the combustion chamber will be the fire box and the lead pot will be the water tubes. In this case, the thermocouple, 7, and the galvanometer, 42, will be substituted with a pressure gauge with a pointer similar to 43, 45, 44, operating identically as described to change the temperature in the fire box in accordance with the changes in boiler pressure.

One other example of this invention's utility is to control steam or gas supply feeding to an outlying distribution point. In such cases, it is the practice to have a control gauge at the distribution point open or close a valve at the control station in order to effect a uniform supply pressure at the distribution point. However, due to the lag over a long stretch of pipe line, this arrangement always causes "hunting" because the valve continues to open or close for a period equal to the time lag after sufficient pressure change has been effected; in this case, the thermocouple, 7, and galvanometer, 42, will be substituted with a pressure gauge and thermocouple 6, and galvanometer, 25, may either be substituted with another pressure gauge or a flow meter. The rest of the system remains substantially as described.

The usefulness of this invention is particularly in evidence where it is desired to maintain a certain condition constant indirectly by changing some other condition on which the first condition depends, but where there exists a substantial time lag in the responsiveness of the one condition to the other, as well as certain energy losses which all tends to require substantially larger corrections of the effective conditions than seemingly is called for by the affected conditions.

I claim:

1. An automatic control system, a furnace, two measuring instruments in said furnace, the first measuring instrument installed to measure the heat in the furnace section it is desired to maintain at constant temperature, the second measuring instrument to be installed to measure the temperature nearer where the combustion takes place, a reversible electric motor in the second measuring instrument, electric contacts on the first measuring instrument for operating the reversible motor in the second measuring instrument, electric contacts in this second measuring instrument movable by said reversible motor, limit switches mechanically and electrically connected to said movable contacts and motor to limit the motion of the contacts in accordance with existing time lag to certain positions representing definite temperature differentials in the second measuring instrument, said contacts on the second instrument to have electric connections with fuel controlling means to increase and decrease the fuel supply to the furnace.

2. An automatic control system, a furnace, two measuring instruments associated with said furnace, the first measuring instrument installed to measure the heat in the furnace section it is desired to maintain at constant temperature, the second measuring instrument to be installed to measure the temperature nearer where the combustion takes place, a minimum of three contacts on the first measuring instrument for operating a reversible motor in the second measuring instrument, electric contacts in this second measuring instrument movable by said reversible motor, switch members mechanically and electrically connected to said movable contacts and motor to effect definite step motion of the contacts, said contacts on the second measuring instrument to have electric connections with fuel controlling means to increase and decrease the fuel supply to the furnace.

CHRISTIAN WILHJELM.